United States Patent

Chang

[11] Patent Number: 5,736,167
[45] Date of Patent: Apr. 7, 1998

[54] MOLD DEVICE FOR MAKING SAFETY SHOE

[76] Inventor: Hui Hwa Chang, No. 46, Yii Her Street, Taiping City, Taichung Hsien, Taiwan

[21] Appl. No.: 810,509

[22] Filed: Feb. 27, 1997

[51] Int. Cl.⁶ .......................... B29C 45/14; B29C 45/26
[52] U.S. Cl. .......................... 425/119; 249/91; 249/171; 249/172; 264/244; 264/275
[58] Field of Search .................. 249/91, 93, 171, 249/172; 425/3, 119, 129.2, 442; 264/244, 275

[56] References Cited

U.S. PATENT DOCUMENTS

| | | | |
|---|---|---|---|
| 3,141,195 | 7/1964 | Haas | 425/119 |
| 3,315,317 | 4/1967 | Winkler | 425/119 |
| 3,343,223 | 9/1967 | Ludwig | 425/119 |
| 3,510,912 | 5/1970 | Lane | 425/119 |
| 3,771,928 | 11/1973 | Crostyn et al. | 425/119 |
| 3,813,201 | 5/1974 | Frederick et al. | 425/119 |
| 4,032,611 | 6/1977 | Fukuoka | 425/119 |
| 4,778,145 | 10/1988 | Sarori et al. | 425/119 |

*Primary Examiner*—Khanh P. Nguyen
*Attorney, Agent, or Firm*—Charles E. Baxley, Esq.

[57] ABSTRACT

A mold device for making a safety shoe includes a last and a post secured on a board. The last includes a number of spacers and a number of cone-shaped supports formed on top for engaging with a protector and for spacing the protector from the last. Two mold pieces are pivotally coupled to the post and each includes a mold cavity for engaging with the last. A cover is pivotally coupled to the post. The spacers and the supports may space the protector from the last and the mold pieces and the cover for allowing the protector to be engaged in the safety shoe.

1 Claim, 4 Drawing Sheets

MOLD DEVICE FOR MAKING SAFETY SHOE

BACKGROUND OF THE INVENTION

1. Field of the Invention

The present invention relates to a mold, and more particularly to a mold device for making safety shoes.

2. Description of the Prior Art

Typical safety shoes comprise a toe protector engaged in the front portion of the shoe. However, it is difficult to engage the toe protector in the shoe such that the toe protector is typically secured in the shoe manually.

The present invention has arisen to mitigate and/or obviate the afore-described disadvantages of the conventional mold devices for making safety shoes.

SUMMARY OF THE INVENTION

The primary objective of the present invention is to provide a mold device for molding the toe protector in the shoe.

In accordance with one aspect of the invention, there is provided a mold device for making a safety shoe, the mold device comprises a board, a last and a post secured on the board, the last including an upper portion having a number of spacers and a number of cone-shaped supports for engaging with a protector and for spacing the protector from the upper portion of the last, the post including two side pivot shafts and an upper lateral pivot axle, a pair of mold pieces pivotally coupled to the post at the pivot shafts respectively, the mold pieces each including a mold cavity for engaging with the last, and a cover pivotally coupled to the post at the pivot axle. The spacers and the supports may space the protector from the last and the mold pieces and the cover for allowing the protector to be engaged in the safety shoe.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
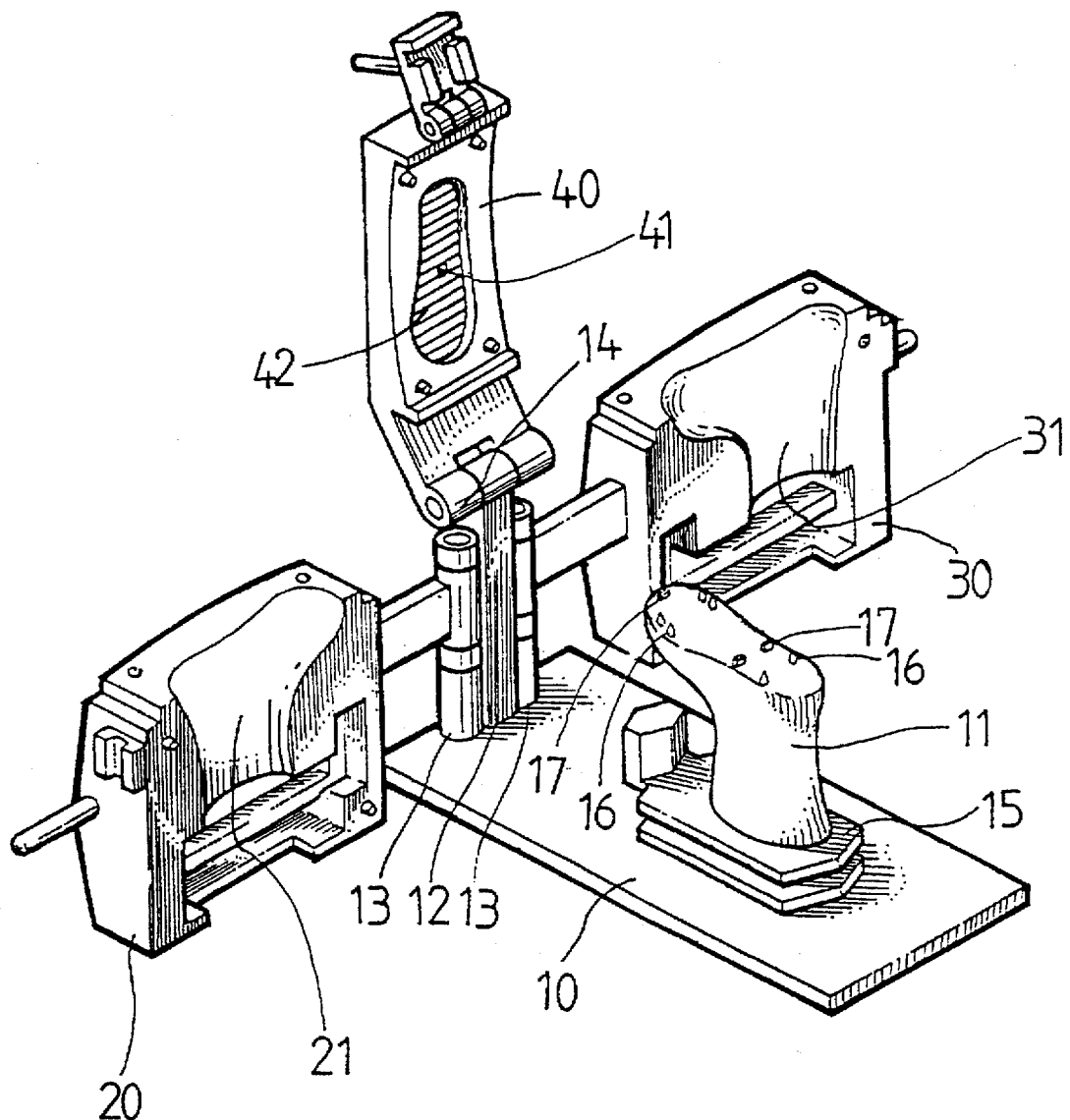
FIG. 1 is a perspective view of mold device in accordance with the present invention.
Figure 2:
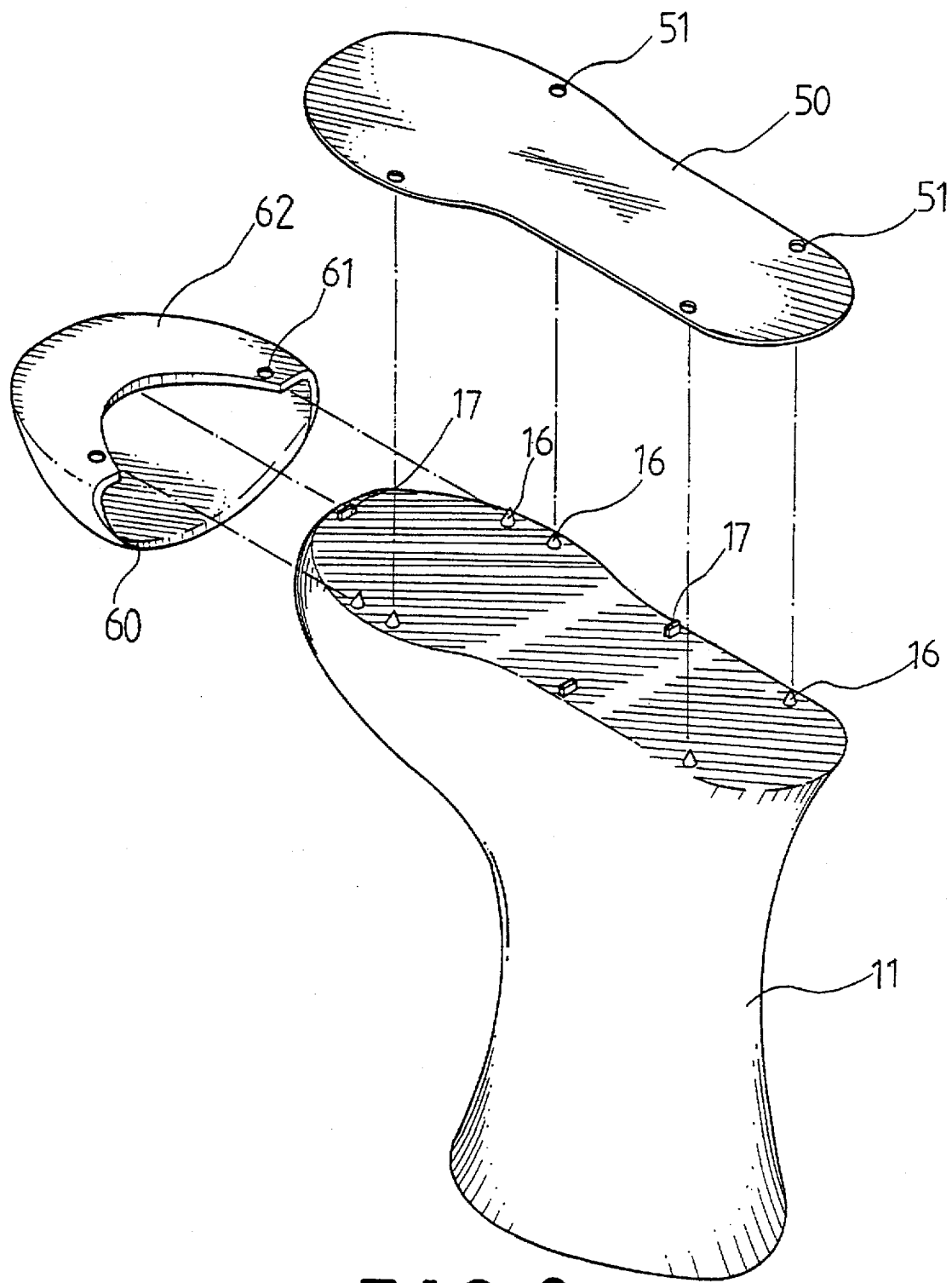
FIG. 2 is a perspective view illustrating the engagement of the protector to the last.
Figure 3:
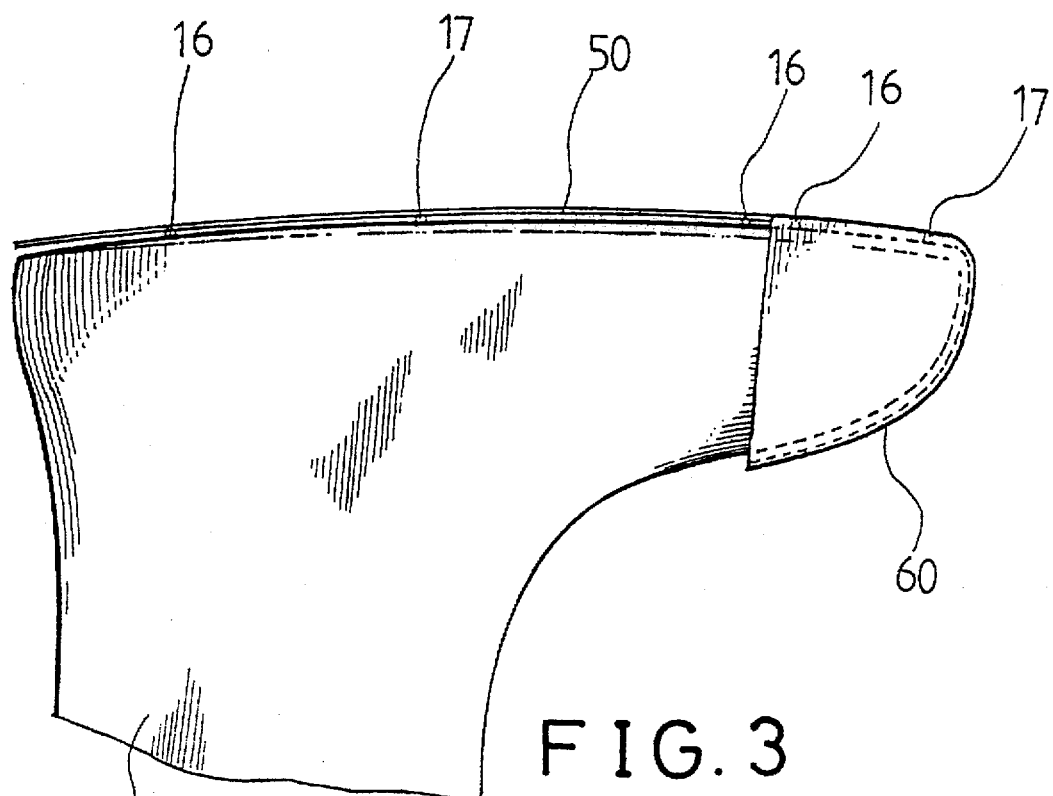
FIG. 3 is a side view of the last and the protector.

Referring to the drawings, and initially to FIGS. 1 to 3, a mold device for making a safety shoe in accordance with the present invention comprises a board 10 and a base 15 secured on the board 10 for supporting a last 11 which includes a number of spacers 17 and a number of cone-shaped supports 16 secured on the upper portion. A post 12 is extended upward from the board 10. Two mold pieces 20, 30 are pivotally coupled to the post 12 at two pivot shafts 13 for allowing the mold pieces 20, 30 to be rotated about the pivot shafts 13 respectively. The mold pieces 20, 30 each includes a mold cavity 21, 31 for engaging with the last 11 and the base 15. A cover 40 is pivotally coupled to the post 12 at a pivot axle 14 for allowing the cover 40 to be rotated about the pivot axle 14. The cover 40 includes a mold cavity 42 for engaging with the last 11. A gap may be formed between the last 11 and the mold pieces 20, 30 and the cover 40 for receiving injecting plastic materials. The cover 40 includes includes a port 41 for injecting plastic material into the mold device.

Figure 4:
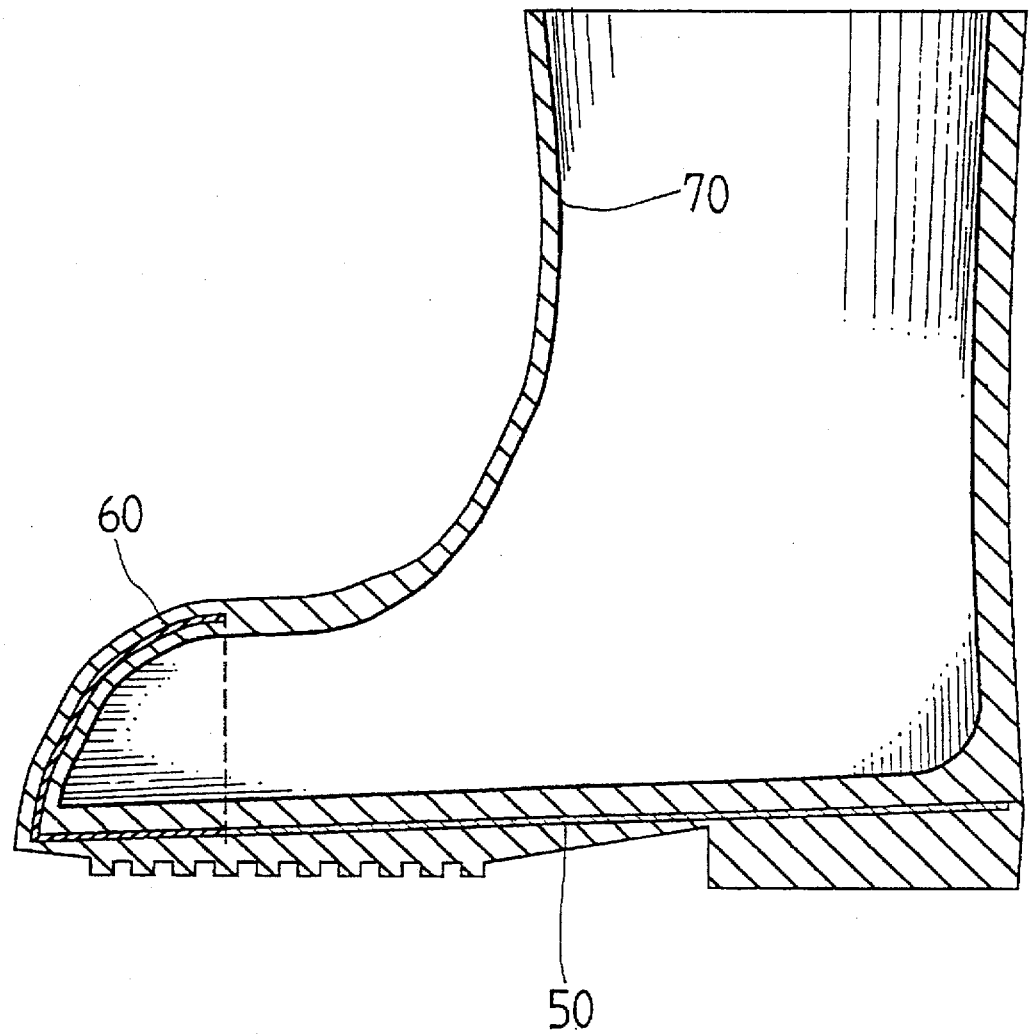
FIG. 4 is a cross sectional view of the shoe illustrating the engagement of the protector in the shoe.

As best shown in FIGS. 2 and 3, a toe protector 60 includes a cap shape and includes two holes 61 for engaging with the cone-shaped supports 16 and includes a bottom 62 for engaging with the spacers 17 which may space the bottom 62 from the upper portion of the last 11 for allowing the plastic materials to be injected into the gap formed between the last 11 and the bottom 62 of the toe protector 60. A plate 50 is engaged on the spacers 17 and includes a number of holes 51 for engaging with the cone-shaped supports 16 such that the plate 50 may also be spaced from the upper portion of the last 11 for allowing the plastic materials to be injected into the gap formed between the last 11 and the plate 50 and such that the toe protector 60 and the plate 50 may be easily molded and engaged in the shoe 70, as shown in FIG. 4. The toe protector 60 and the plate 50 are preferably made of metal or similar strong relatively right material.

Figure 5:
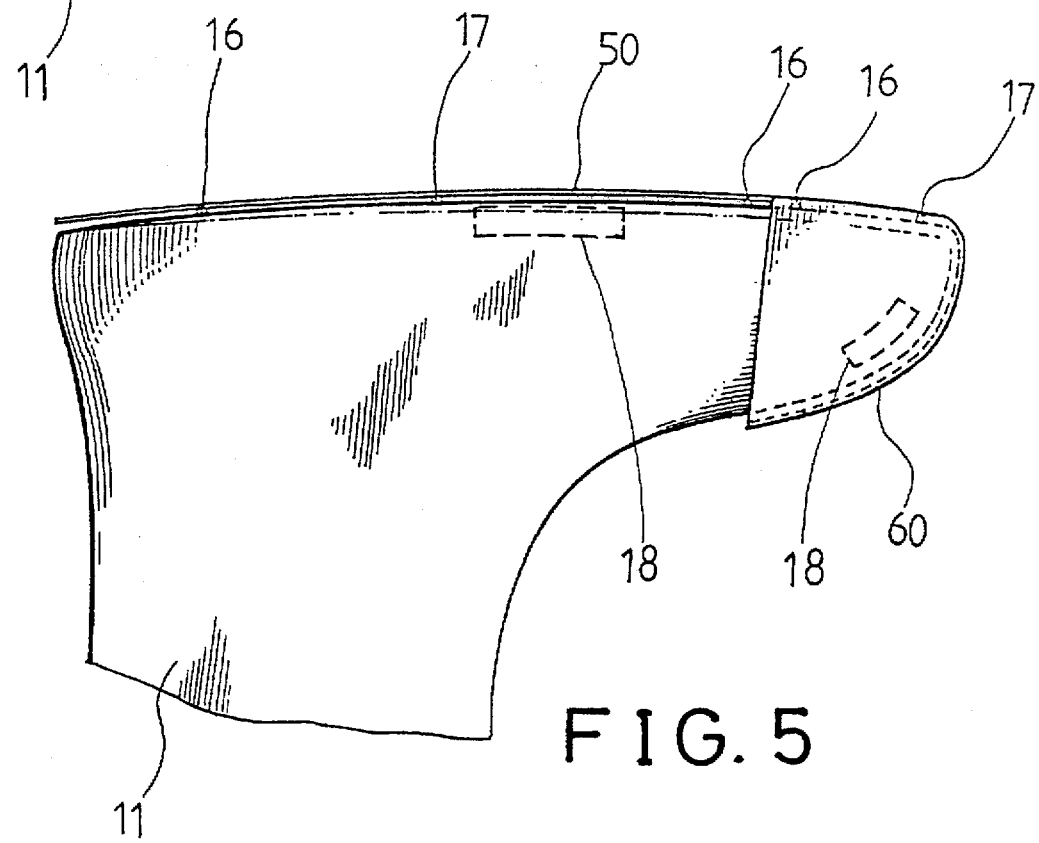
FIG. 5 is a side view illustrating another application of the last.

Referring next to FIG. 5, the toe protector 60 and the plate 50 may be formed as an integral piece. In addition, one or more magnets 18 are embedded in the last 11 for attracting and for positioning the toe protector and the plate 50 in place.

Accordingly, the mold device in accordance with the present invention includes a number of spacers and a number of cone-shaped supports for engaging with the toe protector and the plate and for spacing the toe protector and the plate from the last.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A mold device for making a safety shoe, said mold device comprising:

a board, a last and a post secured on said board, said last including an upper portion having a plurality of spacers and a plurality of cone-shaped supports for engaging with a protector and for spacing the protector from said upper portion of said last, said post including two side pivot shafts and an upper lateral pivot axle, a pair of mold pieces pivotally coupled to said post at said pivot shafts respectively, said mold pieces each including a mold cavity for engaging with said last, and a cover pivotally coupled to said post at said pivot axle, said spacers and said supports being adapted to support and to space the protector from said last and said mold pieces and said cover for allowing the protector to be engaged in the safety shoe.

* * * * *